TRANSISTOR POWER SUPPLY

Filed Jan. 14, 1958

INVENTORS.
EUGENE H. BEACH
OSCAR P. MANLEY
BY
ATTYS.

2,953,737
Patented Sept. 20, 1960

2,953,737

TRANSISTOR POWER SUPPLY

Eugene H. Beach, Silver Spring, Md., and Oscar P. Manley, Cambridge, Mass., assignors to the United States of America as represented by the Secretary of the Navy Filed Jan. 14, 1958, Ser. No. 708,961
9 Claims. (Cl. 321—45)
(Granted under Title 35, U.S. Code (1952), sec. 266)

The invention described herein may be manufactured and used by or for the Government of the United States of America for governmental purposes without the payment of any royalties thereon or therefor.

This invention relates generally to an electrical energy supply circuit employing semiconductor translating devices, and more particularly to a transistor oscillator-amplifier circuit for providing output impulses of a predetermined repetition rate and utilizing a simplified interstage coupling and feedback network.

Although square wave impulse generators employing transistorized oscillator-amplifier stages and utilizing transformer interstage coupling have been heretofore devised, the majority of these prior art circuits have incorporated the transformer arrangements of electron tube circuitry wherein separate primary, secondary and feedback windings are provided on the coupling transformer for effecting energy transformation from the oscillator to the amplifier and for sustaining operation of the oscillator. It will be apparent to one skilled in the art that a transformer having all of the aforementioned windings will be relatively large in size and weight and is not conducive to present day circuit miniaturization practices.

Accordingly, a principal object of the present invention is to provide a new and improved, simple and compact power supply circuit.

Another object of this invention is to provide a new and improved transistorized circuit source of square wave energy pulses of a preselected pulse repetition rate.

Still another object of the instant invention is the provision of a simplified transformer coupling and feedback circuit for an oscillator-amplifier circuit employing semiconductor circuit elements.

A further object of this invention is to provide a new and improved oscillator-amplifier circuit having an interstage energy transformation arrangement wherein one transformer winding concurrently operates to couple a portion of the energy generated by the oscillator to the amplifier and to return a portion of the generated energy to the oscillator.

Figure 1:
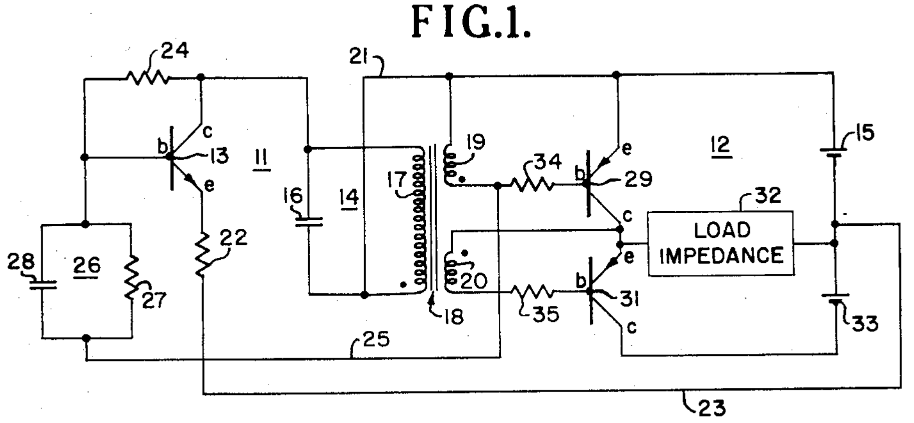
Figure 2:
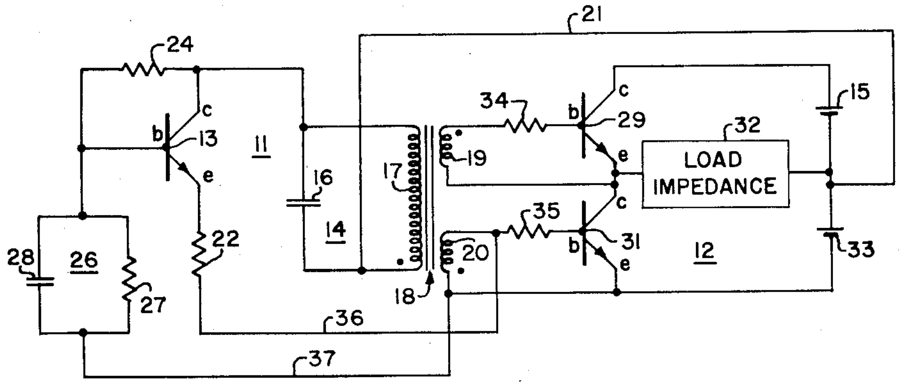

Other objects and many of the attendant advantages of this invention will be readily appreciated as the same becomes better understood by reference to the following detailed description when considered in connection with the accompanying drawing wherein:

Fig. 1 is a schematic diagram of one embodiment of a transistorized power supply circuit according to the present invention; and Fig. 2 is a schematic diagram of an alternative embodiment of the power supply circuit of Fig. 1.

Referring now to the drawing wherein like reference numerals designate like parts throughout the several views, and more particularly to Fig. 1 wherein the pulse power supply is shown as including a sinusoidal oscillator circuit and a power amplifier output circuit generally designated by reference numerals 11 and 12, respectively. Oscillator circuit 11 includes a n-p-n type junction transistor 13 having emitter, collector and base electrodes, and operating in the conventional common emitter configuration. The collector electrode is connected through the oscillation frequency determining resonant network 14 to one side of a suitable operating bias potential source, such as battery 15. The oscillation frequency determining network 14 consists of a capacitor 16 shunt connected across the primary winding 17 of an interstage, or coupling transformer 18. The transformer also includes a pair of substantially identical secondary windings 19 and 20 inductively coupled to primary winding 17. Conductor 21 provides a circuit from tank network 14 to the battery 15. The emitter electrode of transistor 13 is connected through a current limiting resistor 22 and conductor 23 to the other side of battery 15. A resistor 24 may be connected between the base and collector electrodes of the transistor to provide a D.C. bias potential path between the two electrodes for insuring self-initiation of oscillations in oscillator circuit 11. A positive, or regenerative, feedback loop 25 is provided between the collector and base electrodes of transistor 13 for sustaining oscillatory operation of the oscillator circuit, as will be more fully described hereinafter. The regenerative feedback loop 25 includes the secondary winding 19 and a self biasing network 26 which consists of parallel coupled resistor 27 and capacitor 28. The time constant of the biasing network is made substantially larger than the period of oscillation, as established by tank circuit 14, thereby providing for class C operation of oscillator circuit 11.

The sinusoidal alternating current signal generated by the oscillator 11 is inductively coupled through transformer 18 to the power amplifier circuit 12. The power amplifier circuit includes a pair of junction transistors 29 and 31 of a conductivity type, namely, p-n-p, different from that of transistor 13 connected in a push-pull single ended circuit configuration wherein the energizing currents flow in series through the two transistors and the output signal across the load impedance 32 is derived from the two transistors. The emitter and base electrodes of transistors 29 and 31 are individually connected across secondary windings 19 and 21, respectively, which windings are so poled in relation to one another as to simultaneously apply a 180° out of phase alternating current signal to their respective transistors. Suitable operating bias potential is provided by battery 33 for transistor 31, while battery 15, in addition to supplying transistor 13 also provides suitable operating bias potential for transistor 29. It will be understood by one skilled in the art to which the instant device relates that the polarities of the respective windings of coupling transformer 14 are preselected so as to render transistor 29 translatory and transistor 31 cut-off in response to the cessation of collector current flow in oscillator circuit 11, and transistor 29 cut-off and transistor 31 translatory during the period of collector current flow. Each of transistors 29 and 31 is overdriven upon being rendered alternatively translatory thereby effectively operating as a closed switch for alternatively applying the potentials of batteries 15 and 33 across load impedance 32 in the form of square wave energy pulses. In view of the push-pull operation of transistors 29 and 31 the pulse repetition rate will be twice that of the frequency of the alternating current signal generated by oscillator 11. Resistors 34 and 35 may be interposed in the respective base circuits of transistors 29 and 31, respectively, to improve the shape of the square wave pulses appearing across the load 32. In addition during the cut-off operational period of transistor 29, the alternating current signal appearing across secondary winding 19 is available as a suitable potential in the feedback loop 25 for sustaining oscillation of oscillator circuit 11. Secondary winding 19 therefore operates to provide both an input signal for transistor 19 and a feedback signal for feedback loop 25 thereby avoiding the need for separate windings for these operations as in the prior art circuits.

Although the power supply circuit of Fig. 1 is illustrated and described as utilizing unlike type junction transistors in the oscillator and power amplifier componential stages thereof, the circuit is not so limited and identical type junction transistors may be employed throughout, such for example as n-p-n type illustrated in the embodiment of Fig. 2.

In this alternative arrangement, the poling of secondary windings 19 and 20 is reversed to conform to the n–p–n type junction transistors 29 and 31. In view of this variation, secondary winding 20 is utilized in a feedback loop 36 for providing the necessary energy feedback to sustain oscillations in oscillator 11. In addition battery 33 is connected through conductors 21 and 37 to the oscillator circuit 11 for providing suitable operating bias potential thereto.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An electronic power supply comprising, in combination, an oscillator stage including a first transistor, first circuit means providing suitable operating bias potentials for said first transistor, second circuit means connected to said first transistor including a first inductance winding for controlling the frequency of said oscillator stage, a second inductance winding electrically coupled between said first winding and said oscillator stage for providing positive feedback to said oscillator stage to sustain oscillation thereof; and an output amplifier stage including a pair of transistors coupled together in a single ended push-pull relation across a load, third circuit means providing suitable operating bias potentials for said pair of transistors, fourth circuit means connecting one of said pair of transistors to said second winding, a third inductance winding electrically coupled to said first winding, and fifth circuit means for connecting the other of said pair of transistors to said third winding, said second and third windings being so poled relative to one another in said fourth and fifth circuit means, respectively, as to concurrently render one of said pair of transistors translatory and the other of said pair of transistors cut-off in response to an oscillatory signal appearing across said first winding.

2. An electronic power supply according to claim 1 wherein each of said transistors is of the junction type.

3. An electronic power supply according to claim 1 and including biasing potential circuit means for initiating self-oscillation of said oscillator stage.

4. An electronic power source comprising a plurality of junction transistors each having base, emitter, and collector electrodes, a pair of direct current energy sources, an interstage transformer having a primary winding and a pair of secondary windings, said secondary windings being oppositely poled relative to one another, a capacitor connected across said primary winding for providing a resonant network to regulate oscillations of a first of said transistors, a first circuit path interconnecting the collector and emitter electrodes of said first transistor, said path including a resistance, a first one of said sources, and said resonant network, a second and third ones of said transistors being connected in a push-pull relation, a second circuit path interconnecting the emitter and collector electrodes of said second transistor and including a load impedance and said first source, a third circuit path interconnecting the emitter and collector electrodes of said third transistor and including said load impedance and a second one of said sources, a fourth circuit path interconnecting the base and emitter electrodes of said second transistor and including one of said secondary windings, a fifth circuit path interconnecting the base and emitter electrodes of said third transistor and including another of said secondary windings, said secondary windings, being so arranged in said fourth and fifth circuit paths as to render said second and third transistors alternatively translative in response to an oscillatory signal across said primary winding, and a feedback circuit path connecting one of said secondary windings with said first transistor for maintaining said first transistor oscillatory.

5. An electronic power source according to claim 4 and including a resistor connected across the base and collector electrodes of said first junction transistor for enhancing the initiation of oscillations thereof.

6. An electronic power source according to claim 4 and including a resistor serially inserted in each of said fourth and fifth circuit paths for controlling the translational operation of said second and third transistors.

7. An electronic power source according to claim 9 wherein said biasing network includes a parallel connected resistor and capacitor having a time constant characteristic substantially longer than the period of oscillation as established by said resonant network.

8. An electronic power source according to claim 4 wherein said feedback circuit path includes a parallel connected resistance-capacitance biasing network coupled between said one of said secondary windings and the base of said first transistor.

9. An electronic power source comprising, in combination, a transistor oscillator, said oscillator including the primary winding of a transformer, said transformer having a pair of secondary windings, each one of said secondary windings being connected to one of a pair of transistors, means coupling said pair of transistors in a push-pull relation to form an output amplifier stage, means connecting said amplifier stage to a load and feedback circuit means connected with one of said secondary windings for providing positive feedback to said oscillator.

References Cited in the file of this patent

UNITED STATES PATENTS

| | | |
|---|---|---|
| 2,745,009 | Moulon | May 8, 1956 |
| 2,757,243 | Thomas | July 31, 1956 |
| 2,846,581 | Volkers | Aug. 5, 1958 |
| 2,849,614 | Royer et al. | Aug. 26, 1958 |
| 2,854,615 | Light | Sept. 30, 1958 |

FOREIGN PATENTS

| | | |
|---|---|---|
| 784,444 | Great Britain | Oct. 9, 1957 |

OTHER REFERENCES

Power Transistors Circuit Design and Data, published by Transistor Products, Incorporated, Boston, Mass., published March 1954.